(12) United States Patent
Herrmann et al.

(10) Patent No.: US 7,926,022 B2
(45) Date of Patent: Apr. 12, 2011

(54) SURROGATE-BASED AND EXTENDS-BASED CONTEXT LOOK-UP

(75) Inventors: Michael Alexander Herrmann, St. Paul, MN (US); Leon Curtis Johnson, Inver Grove Heights, MN (US); Richard D. Patton, Hastings, MN (US)

(73) Assignee: Lawson Software, Inc., Saint Paul, MN (US)

( * ) Notice: Subject to any disclaimer, the term of this patent is extended or adjusted under 35 U.S.C. 154(b) by 931 days.

(21) Appl. No.: 11/400,723

(22) Filed: Apr. 7, 2006

(65) Prior Publication Data
US 2007/0240105 A1 Oct. 11, 2007

(51) Int. Cl.
*G06F 9/44* (2006.01)
(52) U.S. Cl. ......................... 717/100; 717/140
(58) Field of Classification Search .................. 717/140
See application file for complete search history.

(56) References Cited

U.S. PATENT DOCUMENTS

| | | | | |
|---|---|---|---|---|
| 5,790,861 A * | 8/1998 | Rose et al. | ..................... | 717/145 |
| 5,854,932 A * | 12/1998 | Mariani et al. | ................ | 717/116 |
| 6,675,377 B1 * | 1/2004 | Tanaka | ......................... | 717/152 |
| 6,701,305 B1 * | 3/2004 | Holt et al. | ....................... | 706/45 |
| 6,813,764 B2 * | 11/2004 | Stoodley | ........................ | 717/153 |
| 7,350,165 B2 * | 3/2008 | Miyachi et al. | .................... | 716/3 |
| 2006/0123198 A1 * | 6/2006 | Asao | ........................... | 711/137 |

* cited by examiner

*Primary Examiner* — Wei Y Zhen
*Assistant Examiner* — Phillip H Nguyen
(74) *Attorney, Agent, or Firm* — Schwegman, Lundberg & Woessner, P.A.

(57) ABSTRACT

Methods, apparatus and systems for processing of code that includes key fields having surrogate and extends relationships are described. In some embodiments, a method includes receiving a pattern language code having definitions of a number of classes, wherein a definition of a first class of the number of classes comprises a reference to a field. The method also includes compiling the pattern language code to generate an object code, wherein the compiling comprises validating that the field is defined with a context of the first class. The context includes a second class of the number of classes that has a surrogate relationship with the first class.

17 Claims, 7 Drawing Sheets

SURROGATE-BASED AND EXTENDS-BASED CONTEXT LOOK-UP

COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

TECHNICAL FIELD

The application relates generally to the field of software, more particularly, to compilation and execution of software.

BACKGROUND

Creation of software applications, which includes design, development, and testing of the code, is typically an iterative process. Testing may find errors in the design and/or the development of the code. Accordingly, the design and/or development of the code are updated to correct such errors. The amount of time of such processes is, therefore, typically dependent on the size of the software application and how well such processes are performed. In addition to the debugging of the code, updates are typically made to the design and/or development to add additional features to the software application.

A number of different paradigms for the design and development of software applications have attempted to reduce the time of these processes. Such paradigms have included procedural programming, functional programming, object-oriented programming, aspect-oriented programming, and so on. Disadvantageously, designers and developers using these different paradigms have had difficulty identifying the effect(s) that an update or incorporation of an additional feature has on the existing code. In general, this comes from the high level of complexity inherent in modeling sophisticated business processes in general programming or "implementation" languages.

Specific to a business application, the purpose of such an application is to help automate business processes. A business process is a recurring pattern of interactions among human agents. Business processes evolve over time through a series of adaptations to changes in the environment. A business process is a complex adaptive system. A business application may be a model of that complex adaptive system at any point in time. One aspect of a business application is that it should be flexible enough to adapt and evolve in step with the adapting and evolving business process that it is modeling. If an application is not flexible enough to evolve it is considered to be rigid and brittle and should be replaced.

The lack of flexibility of a business application comes about because of the inherent rigidity of general programming languages when they are used to model multi-dimensional problems. In general, the problem is that each interaction of each dimension should be explicitly codified in the language. There have been some improvements to this situation starting with parameterized functions, then object-oriented programming and most recently aspect-oriented programming. None of these approaches have overcome the mechanical rigidity inherent in general purpose computing languages.

SUMMARY

Methods, apparatus and systems for processing of code that includes key fields having surrogate and extends relationships are described. In some embodiments, a method includes receiving a pattern language code having definitions of a number of classes, wherein a definition of a first class of the number of classes comprises a reference to a field. The method also includes compiling the pattern language code to generate an object code, wherein the compiling comprises validating that the field is defined with a context of the first class. The context includes a second class of the number of classes that has a surrogate relationship with the first class.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Figure 1:
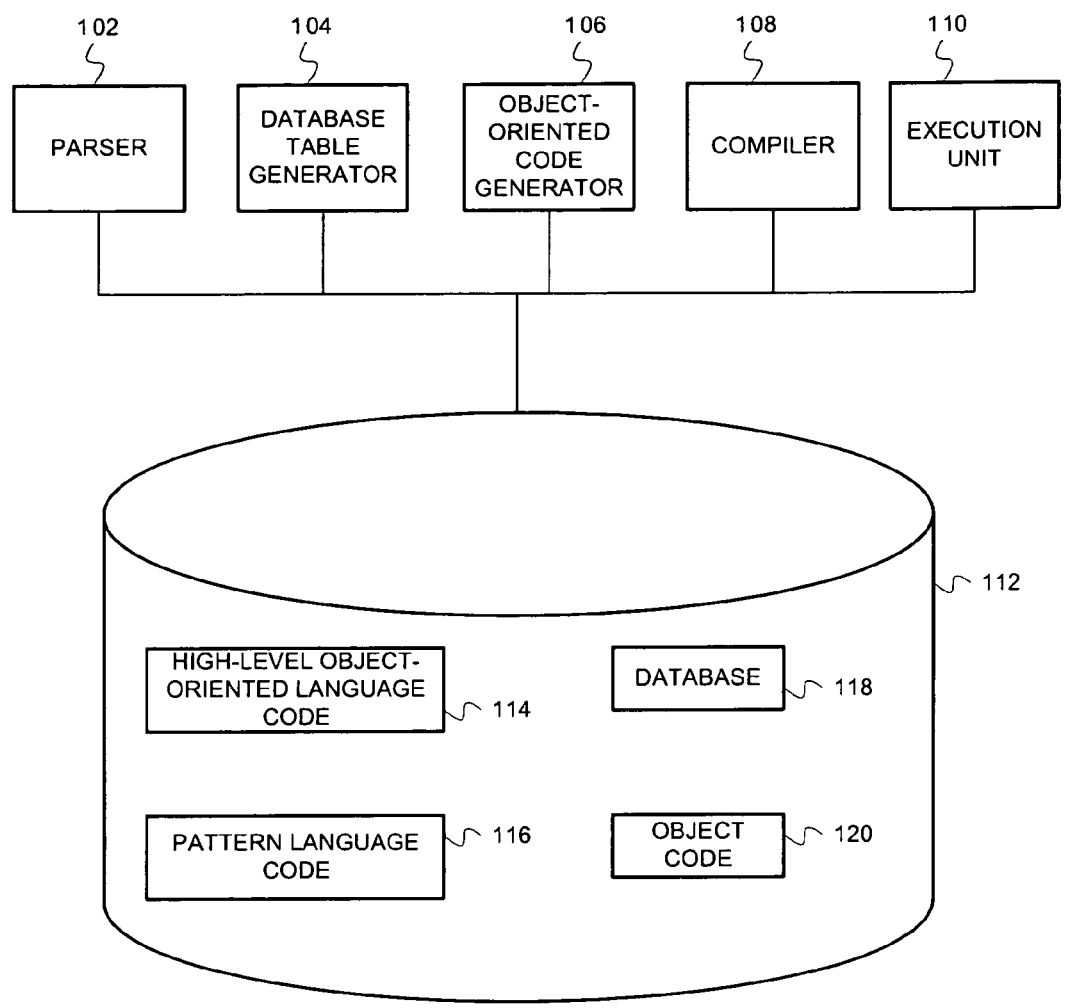
FIG. 1 is a block diagram illustrating a system for creation and processing of a code that includes classes having surrogate and extends relationships, according to some embodiments of the invention.

Methods, apparatus and systems for processing of code that includes classes having surrogate and extends relationships are described. In the following description, numerous specific details are set forth. However, it is understood that embodiments of the invention may be practiced without these specific details. In other instances, well-known circuits, structures and techniques have not been shown in detail so as not to obscure the understanding of this description.

What may be required to overcome the mechanical rigidity inherent in general purpose computing languages is a more specialized design or pattern language that explicitly addresses the dimensionality problem related to how the ontology of the business application is modeled and implemented. Some embodiments of the invention allow for such a design or pattern language. One problem with the current approach is highlighted by how the analysis model and the actual implementation of that analysis model become completely disconnected from each other. It is as though a building is built from a blueprint but in the end the actually built building looks nothing like the blueprint.

Some embodiments of the invention overcome the ontology dimensionality problem and the analysis model/implementation disconnect problem. Such embodiments do this by tying several key concepts into a unique methodology for defining the ontology of the system which allows the ontology logic to be explicitly defined in one place and implicitly referred to at all appropriate dimensional intersections. The first concept is that an entity in the system should not be defined by its "boundary" (its "complete" definition) but rather it should be defined by its "center" (its aseity or "this-ness"). The second concept is that this center itself is defined in terms of its ontological context (its affordance structure). The ontological context itself being made up of other centers within the system. The third concept is that this center is responsible for and thus capable of discovering what context it exists within in order to "adapt" appropriately to that environment. This is in essence a denial of the mechanical metaphor which insists on a rigid context insensitivity. It is rather an embracing of the organic metaphor in which any entity exhibits a very high degree of context sensitivity to its environment. Embodiments of the invention allow for a shift from a mechanical implementation language to a context sensitive design language.

In some embodiments of the invention, entities are modeled as business objects or sets of business objects. The center of a business object or set of business objects may be a new construct called a key field. A key field is a field that knows within itself what business object or set of business objects it is the center for. Additionally, a key field may know what other key fields should (or may) be present within the context it finds itself in. The key field knows how to search for other key field and knows how to direct the various behaviors required in order to maintain the integrity of whatever specific ontological rules are appropriate given the patterns it implements and the structures it finds itself within. With these capabilities the key field may be placed within some other business object that is capable of affording it and the rules that would normally need to be codified at that dimensional intersection are implicitly delegated to the key field. The key field may also automatically discovers its context and then based on that context executes the appropriate logic.

Some embodiments include a design pattern language that defines structures (such as objects and key fields) relative to each other. Embodiments of the invention define logic at the field (key field) level. As further described below, a key field is a symbolic way of referring to a business class. In some embodiments, there is a one-to-one relationship between a business class and a key field. Logic at the key field may include the context for a given class. Logic may include an equivalency between the key field and a business class. Additionally, logic may include a context for a class.

Code may be created based on the design pattern language. This design pattern language code may be parsed to determine whether rules of the design pattern language have been followed during the creation of the design pattern language code. For example, assume that a key field related to a business object includes a given context. If the business object is not defined in such a context, an error may be generated during the parsing of the design pattern language. Additionally, object-oriented code (such as JAVA and C++) may be generated based on the design pattern language code. Accordingly, embodiments of the invention allow for design and coding of code relatively much faster in comparison to conventional design and coding operations.

In some embodiments, relationships (extends and surrogate) are defined between key fields. In some embodiments, for an extends relationship between key fields, the value of the two key fields is the same (both type and value). In some embodiments, for a surrogate relationship between key fields, the type and value of the two key fields may vary. Accordingly, in an extends relationship, the two key fields are essentially referring to the same external object. In a surrogate relationship, one key field (the surrogate) can imply an ontological relationship to another key field. As such, the external object referred to by one key field (the surrogate) is in an ontological relationship with another external object, which can be referred to by the surrogate key field. In some embodiments, for an extends relationship, there is a one-to-one relationship between the key field that extends another key field and vice versa. For a surrogate relationship, there may be a one-to-many relationship between the two key fields.

FIG. 1 is a block diagram illustrating a system for creation and processing of code that includes business classes having surrogate and extends relationships, according to some embodiments of the invention. Operations for the system will be described in greater detail below, in the discussion of FIGS. 2-5. As shown in FIG. 1, a system 100 includes a persistent data store 112. During different parts of the operations described below, the persistent data store 112 may store none, less than all or all of the following: a high-level object-oriented language code 114, a pattern language code 116, an object code 118 and a database 120.

Figure 5:
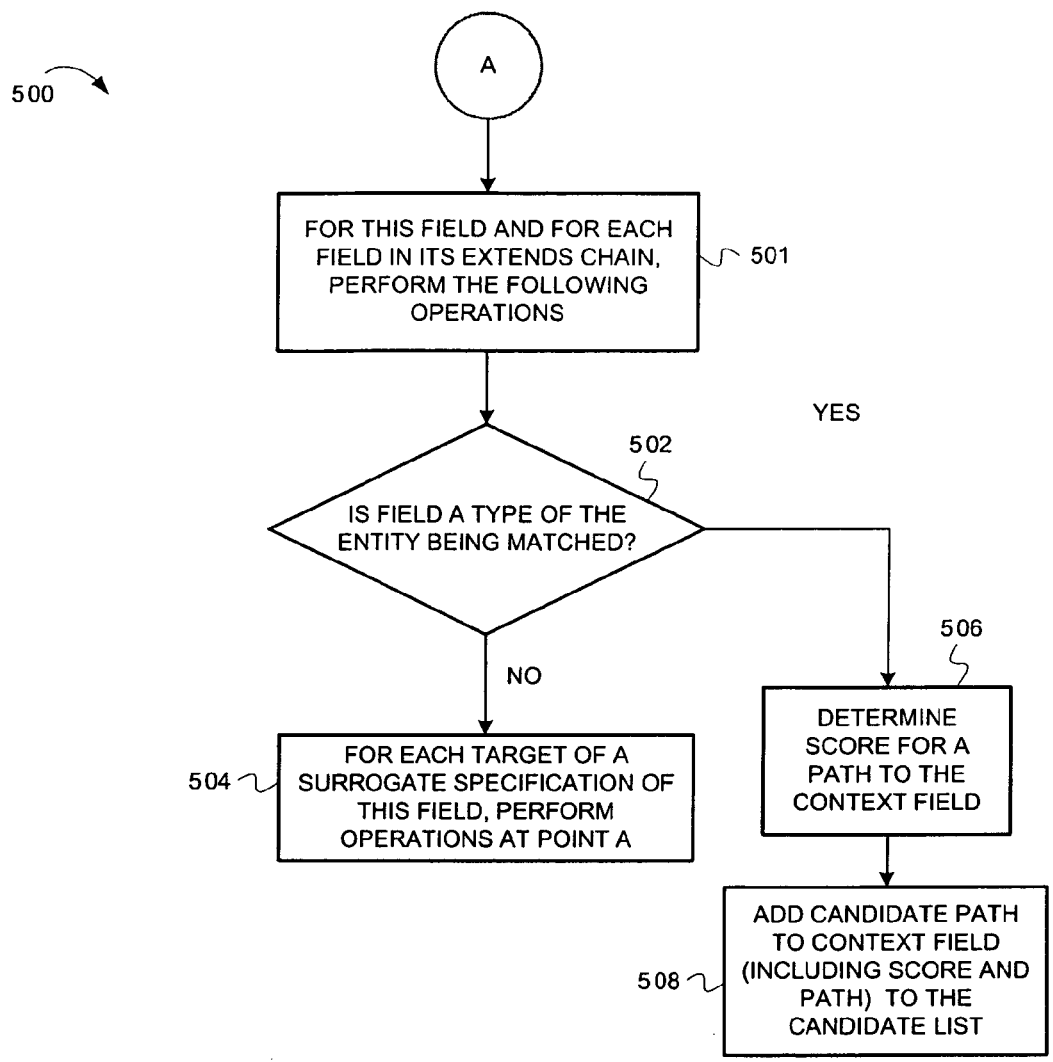
FIG. 5 illustrates a flow diagram for operations to locate candidates paths to a context field among extends and surrogate relationships, according to some embodiments of the invention.

The persistent data store 112, a parser 102, a database table generator 104, an object-oriented code generator 106 and a compiler 108 are coupled together. A software developer may create and store the pattern language code 116 into the persistent data store 112. The parser 102 may parse the pattern language code 116 to generate dictionary tables for the different key field/associated class. Based on the dictionary tables, the database table generator 104 may generate one to a number of different database tables for storage into the database 120. An example database table is shown in FIG. 5, which is described above.

The object-oriented code generator 106 may generate high-level object-oriented code 114 based on the pattern language code 116. The compiler 108 may generate the object code 118 based on the high-level object-oriented code 114. The persistent data store 112 is also coupled to an execution unit 110. In some embodiments, the execution unit 110 contains all elements necessary for executing the object code 118. For example, the execution unit 110 may contain a processor, memory, and software, such as a JAVA runtime environment (available from Sun Microsystems of Santa Clara, Calif.).

Any of the functional units shown in FIG. 1 or otherwise used in conjunction with embodiments of the invention can include machine-readable media including instructions for performing operations described herein. Machine-readable media includes any mechanism that provides (that is, stores and/or transmits) information in a form readable by a machine (for example, a computer). For example, a machine-readable medium includes read only memory (ROM), random access memory (RAM), magnetic disk storage media, optical storage media, flash memory devices, electrical, optical, acoustical or other forms of propagated signals (for example, carrier waves, infrared signals, digital signals, and so on). According to embodiments of the invention, the functional units can be other types of logic (for example, digital logic) for executing the operations described herein.

Figure 2:
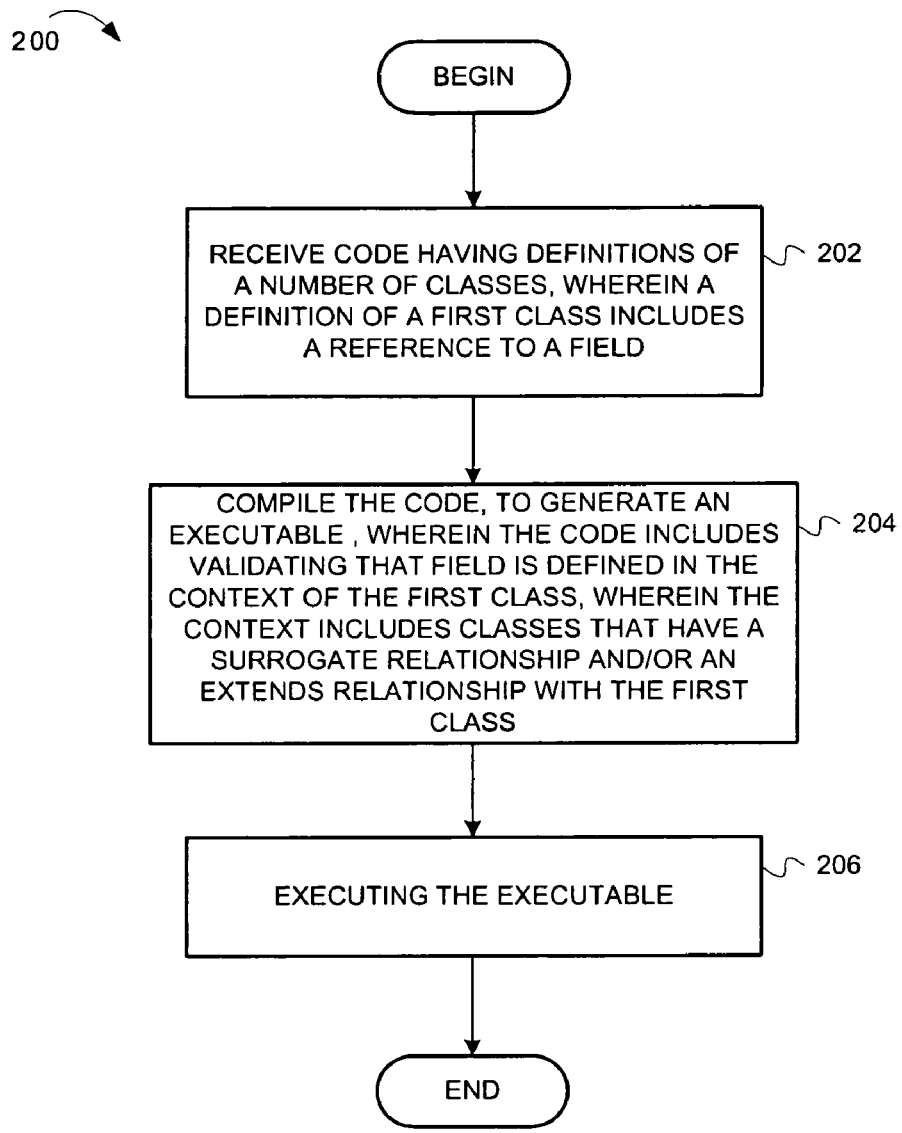
FIG. 2 illustrates a flow diagram of operations for processing of a code that includes classes having surrogate and extends relationships, according to some embodiments of the invention.

This section provides a description of operations for processing of code that includes business classes having surrogate and extends relationship, according to some embodiments of the invention. In certain embodiments, the operations are performed by instructions residing on machine-readable media (e.g., software), while in other embodiments, the methods are performed by hardware or other logic (e.g., digital logic). FIG. 2 illustrates a flow diagram of operations for processing of code that includes classes having surrogate and extends relationships, according to some embodiments of the invention. FIG. 2 illustrates operations that may be executed by different parts of the system 100. The flow diagram 200 commences at block 202.

At block 202, code is received that includes definitions of a number of classes, wherein a first class includes a reference to a field. With reference to FIG. 1, the compiler 108 may receive the code. The compiler 108 may receive the object-oriented code after the parser 102 parses the code. A field may be a key field, an object, any type of variable, etc. For example, the first class may include an assignment, wherein a variable is assigned the value of the field, a conditional statement wherein the value of the field is used to determine the condition, etc. The flow continues at block 204.

At block 204, the code is compiled to generate an executable. The compilation of the code includes validation that the field is defined in the context of the first class (the class where the field is referenced). The context includes classes that have a surrogate relationship and/or extends relationship with the first class. With reference to FIG. 1, the compiler 108 may perform this compilation.

Figure 3:
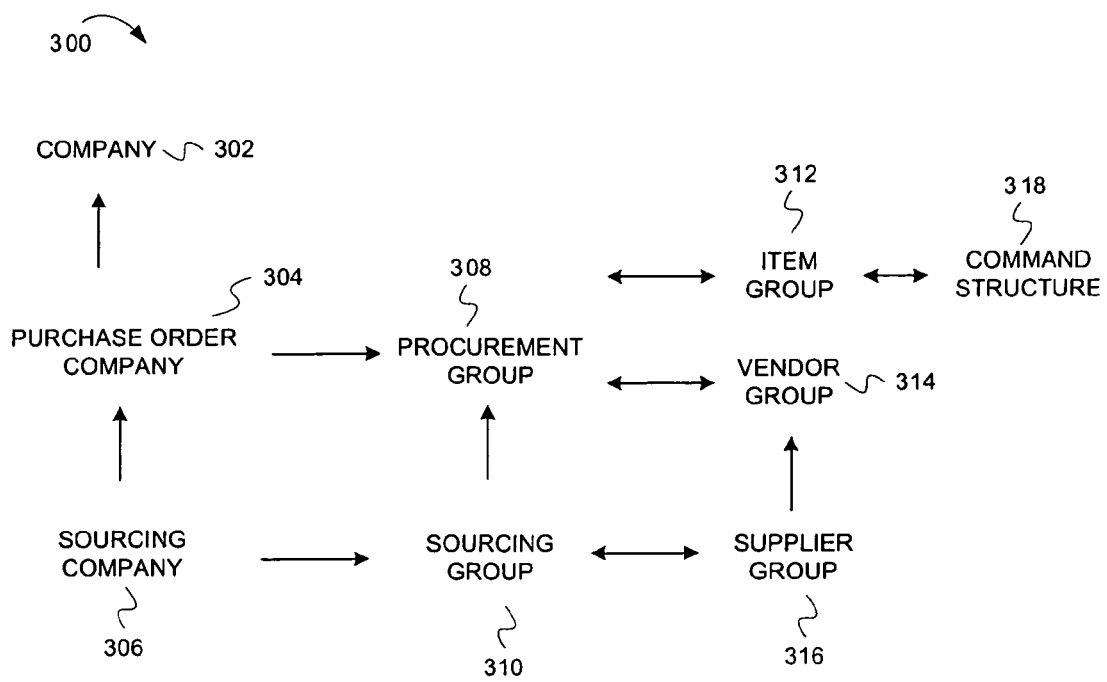
FIG. 3 illustrates extends and surrogate relationships among a number of key fields, according to some embodiments of the invention.

To illustrate, FIG. 3 illustrates extends and surrogate relationships among a number of key fields, according to some embodiments of the invention. FIG. 3 includes a company key field 302, a purchase order company key field 304, a sourcing company key field 306, a procurement group key field 308, a sourcing group key field 310, an item group key field 312, a vendor group key field 314, a supplier group key field 316 and a command structure key field 318. The purchase order company key field 304 extends the company key field 302. The sourcing company key field 306 extends the purchase order company key field 304.

The purchase order company key field 304 is a surrogate for the procurement group key field 308. The procurement group key field 308 is a surrogate for the vendor group key field 314. The procurement group key field 308 is also a surrogate for the item group key field 312. The item group key field 312 is a surrogate for the command structure key field 318. The sourcing group key field 310 extends the procurement group key field 308. The supplier group key field 316 extends the vendor group key field 314.

In some embodiments, the extends relationship is defined such that a first key field that extends a second key field inherits the data (fields, structures, functions, etc.) and may include additional data therein. With reference to FIG. 3, the purchase order company key field 304 may extend the company key field 302 to include data specific to companies that execute purchase orders. For example, the purchase order company 304 may include a function to execute a purchase order.

In some embodiments, the surrogate relationship is defined such that a first key field that is a surrogate for a second key field may act in place/substitution of second key field. For example, while searching the context for the second key field, the compiler 108, may, upon not finding the second key field in context, search the context for the first key field. If the first key field is found, the compiler 108 may consider the first key field to be valid substitution for the second key field.

In some embodiments, the context for a key field (key field A) includes those key fields that have an extend relationship or a surrogate relationship with key field A as well as key fields further up the chain (key fields that have an extend relationship or a surrogate relationship with the key fields that have such relationship with the key field A, etc.). For example, the context for the sourcing company key field 306 includes the purchase order company key field 304, the company key field 302, the procurement group key field 308, the sourcing group key field 310, the supplier group key field 316, the item group key field 312, the vendor group key field 314 and the command structure key field 318.

Figure 4:
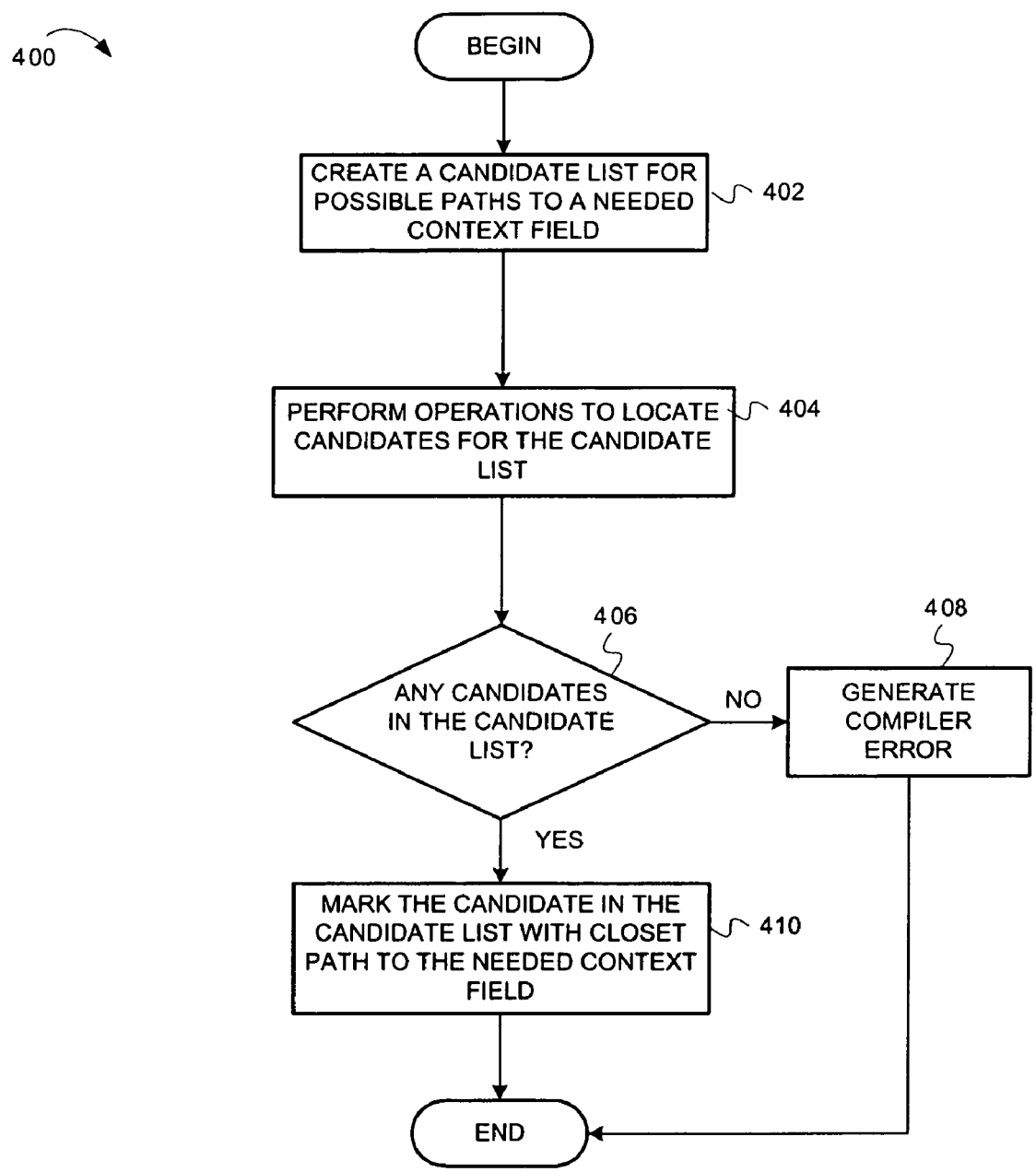
FIG. 4 illustrates a flow diagram for compilation of code that includes key fields having surrogate and extends relationships, according to some embodiments of the invention.

A more detailed description of the operations at block 206 is set forth below with the description of FIG. 4. The flow continues at block 206.

At block 206, the executable is executed. With reference to FIG. 1, the execution unit 110 executes the executable generated. A more detailed description of the operations at block 206 is set forth below with the description of FIG. 5. The operations of the flow diagram 200 are complete.

The operations for compilation of the code are now described. In particular, FIG. 4 illustrates a flow diagram for compilation of code that includes key fields having surrogate and extends relationships, according to some embodiments of the invention. FIG. 4 illustrates operations that may be executed by different parts of the system 100. The flow diagram 400 commences at block 402.

At block 402, a candidate list is created for possible paths to a needed context field. With reference to FIG. 1, the compiler 108 may create the candidate list. The candidate list may be representative of any type of data structure (such as a table, object, etc.). In some embodiments, a context field is a key field that is a context for some entity, object, etc. For example, a key field can be a context for another key field, a business object, etc. Returning to FIG. 3 to illustrate, assume that a business object A has a context field of the command structure key field 318. Assume that a business object B has a context field of the sourcing company key field 306. Also, assume that the business object B includes instructions to access data from the business object A. The business object B does not have a context field that includes the command structure key field 318. Therefore, the compiler 108 may attempt to locate the command structure key field 318 for the business object B based on relationships (extends and surrogate) between its context field (the sourcing company key field 306) and the command structure key field 318. Thus, the compiler 108 may create a number of possible candidate paths from the current context field to the needed context field (as further described below). The flow continues at block 404.

At block 404, operations are performed to locate candidates for the candidate list. With reference to FIG. 1, the compiler 108 may perform these operations. These operations may include the traversal of extend and surrogate relationships among the key fields. A more detailed description of these operations is set forth below (see description of FIG. 5). The flow continues at block 406.

At block 406, a determination is made of whether there are any candidates in the candidate list. With reference to FIG. 1, the compiler 108 may make this determination. In particular, in some embodiments, there may be no candidate paths from the current context field to the needed context field. Returning to the example above from FIG. 3, assume that there is no surrogate relationship between the item group key field 312 and the command structure key field 318. Thus, there is no possible candidate path from the sourcing company key field 306 to the command structure key field 318. Alternatively, the compiler 108 may find one or more candidate paths. If there are no candidates in the candidate list, the flow continues at block 408. Otherwise, the flow continues at block 410, which is described in more detail below.

At block 408, a compiler error is generated. With reference to FIG. 1, the compiler 108 may generate the compiler error. As described above, if there are no candidate paths between the current context field and the needed context field, the compiler cannot access the object having as its context the needed context field. The operations of the flow diagram 400 are complete.

At block 410, the candidate in the candidate list with the closest path to the needed context field is marked. With reference to FIG. 1, the compiler 108 may perform this operation. In particular, the compiler 108 marks the best candidate so that during execution this path is used. The candidate that is selected may be based on a number of different criteria. In some embodiments, a path that includes an extends relationship is considered closer than a path that includes a surrogate relationship. For example, each relationship in a candidate path may be assigned a value. An extends relationship may be assigned a lower value in comparison to a surrogate relationship. For example, an extends relationship may be assigned a value of one, and a surrogate relationship may be assigned a value of two. A score would be determined for each candidate path. The compiler 108 would mark the candidate with the lowest score. The operations of the flow diagram 400 are complete.

FIG. 5 illustrates a flow diagram for operations to locate candidates paths to a context field among extends and surrogate relationships, according to some embodiments of the invention. In particular, the flow diagram 500 illustrates the operations at block 404 of FIG. 4, according to some embodiments of the invention. FIG. 4 illustrates operations that may be executed by different parts of the system 100. The flow diagram 500 commences at block 502.

At block 501, for the current field and for each field in its extends chain, the following operations are performed. With reference to FIG. 1, the compiler 108 may perform these operations. In particular, the compiler 108 may performing the following operations for each key field that has an extends relationship with the entity that is attempting the access. In other words, the compiler 108 may check the current context field for the entity that is attempting the access and may check each field in the extends chain of the current context field. Returning to the example above, the entity attempting to access is the business object B that has a context field of the sourcing company key field 306. The entity that is being accessed is the business object A that has a context field of the command structure key field 318. Therefore, the compiler 108 performs the following operations for each field that has an extends relationship with the business object B.

At block 502, for each field (referenced at block 501), a determination is made of whether the context field is a type of the entity being matched. With reference to FIG. 1, the compiler 108 may perform this operation. In particular, the compiler 108 checks each key field that has an extends relationship with the entity that is attempting the access. Returning to the example above, the entity attempting to access is the business object B that has a context field of the sourcing company key field 306. The entity that is being accessed is the business object A that has a context field of the command structure key field 318. Therefore, the compiler 108 checks each field that has an extends relationship with the business object B. For example, the compiler 108 checks whether the sourcing company key field 306 is the context field (the command structure key field 318) for the entity being accessed. In this example, the sourcing company key field 206 is not. The compiler 108 then checks whether the purchase order company key field 304 is the context field (the command structure key field 318) for the entity being accessed. In this example, the purchase order company key field 304 is not. The compiler 108 then checks whether the company key field 302 is the context field (the command structure key field 318) for the entity being accessed. In this example, the company key field 302 is not. The example is continued at block 504 below. For each field that has an extends relationship, if the context field is not an extension of the entity, the flow continues at block 504. Otherwise, the flow continues at block 506, which is described in more detail below.

At block 504, for each target of a surrogate specification of this field, the operations at point A are performed. With reference to FIG. 1, the compiler 108 may perform these operations. In particular, the compiler 108 checks each key field that has a surrogate relationship with the entity that is attempting the access. Returning to the example above, the compiler 108 checks each field that has a surrogate relationship with the business object B. For example, the key fields having the surrogate relationship include the sourcing group key field 310, the procurement group key field 308, the supplier group key field 316, the vendor group key field 314, the item group key field 312 and the command structure key field 318. Therefore, the compiler 108 checks these key fields to determine whether such fields are a context field for the entity being accessed. In other words, the compiler 108 checks whether these key fields are the command structure key field 318.

At block 506, a score is determined for a path to the context field. With reference to FIG. 1, the compiler 108 may determine the score. In some embodiments, there may be multiple paths to the context field. For example, from an entity having a context field of the sourcing company key field 306 to the command structure key field 318, a first candidate path may be the purchase order company key field 304, the procurement group key field 308, the item group key field 312 and the command structure key field 318. A second candidate path may be the sourcing group key field 310, the procurement group key field 308, the item group key field 312 and the command structure key field 318. A third candidate path may be the sourcing group key field 310, the supplier group key field 316, the item group key field 312 and the command structure key field 318. As described above, each candidate path may be assigned a score based on a number of different criteria (such as the number of extends relationship and surrogate relationships). In some embodiments, the best candidate path is the path with the lowest score. The surrogate relationship is assigned a value that is greater than an extends relationship. For example, a surrogate relationship may be assigned a value of two, while an extends relationship may be assigned a value of one. The flow continues at block 508.

At block 508, the candidate path to the context field is added to the candidate list. With reference to FIG. 1, the compiler 108 may perform this operation. The compiler 108 may add the key fields in the candidate path and a score associated with the candidate path to the candidate list. The operations of the flow diagram 500 are complete.

Figure 6:
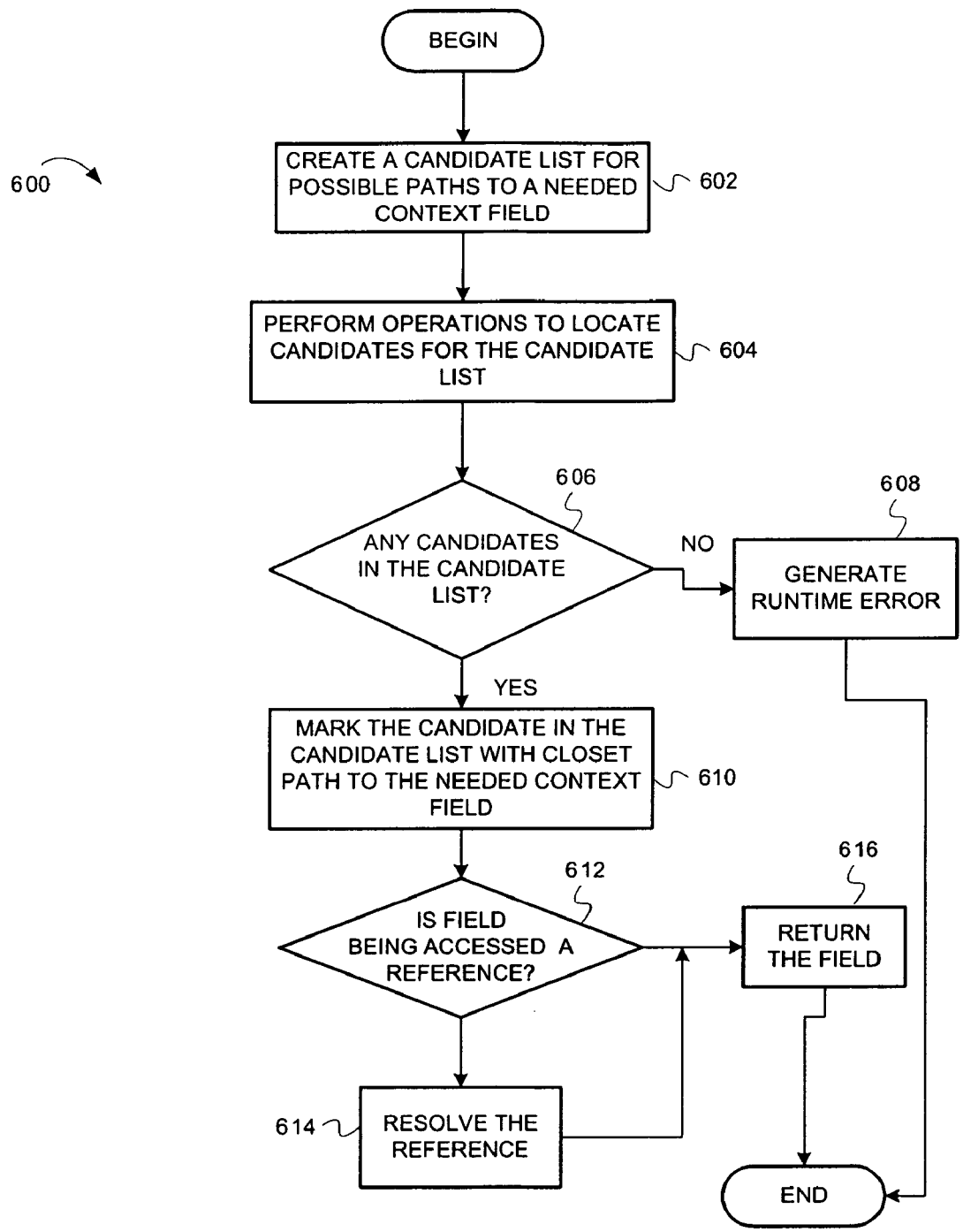
FIG. 6 illustrates a flow diagram of operations for execution of code that includes key fields having surrogate and extends relationships, according to some embodiments of the invention.

The operations for execution of the code are now described. In particular, FIG. 6 illustrates a flow diagram of operations for execution of code that includes key fields having surrogate and extends relationships, according to some embodiments of the invention. In contrast to FIG. 4, FIG. 6 relates to execution of the code and traversing the call stack to locate a context field for an entity being accessed. FIG. 6 illustrates operations that may be executed by different parts of the system 100. The flow diagram 600 commences at block 602.

At block 602, a candidate list is created for possible paths to a needed context field. With reference to FIG. 1, the execution unit 110 may create the candidate list. The candidate list may be representative of any type of data structure (such as a table, object, etc.). In some embodiments, a context field is a key field that is a context for some entity, object, etc. For example, a key field can be a context for another key field, a business object, etc. Returning to FIG. 3 to illustrate, assume that a business object A has a context field of the command structure key field 318. Assume that a business object B has a context field of the sourcing company key field 306. Also, assume that the business object B includes instructions to access data from the business object A. The business object B does not have a context field that includes the command structure key field 318. Therefore, the compiler 108 may attempt to locate the command structure key field 318 for the business object B based on relationships (extends and surrogate) between its context field (the sourcing company key field 306) and the command structure key field 318. Thus, the compiler 108 may create a number of possible candidate paths from the current context field to the needed context field (as further described below). The flow continues at block 604.

At block 604, operations are performed to locate candidates for the candidate list. With reference to FIG. 1, the execution unit 110 may perform these operations. These operations may include the traversal of extend and surrogate relationships among the key fields. A more detailed description of these operations is set forth above (see description of FIG. 5). The flow continues at block 606.

At block 606, a determination is made of whether there are any candidates in the candidate list. With reference to FIG. 1, the execution unit 110 may make this determination. In particular, in some embodiments, there may be no candidate paths from the current context field to the needed context field. Returning to the example above from FIG. 3, assume that there is no surrogate relationship between the item group key field 312 and the command structure key field 318. Thus, there is no possible candidate path from the sourcing company key field 306 to the command structure key field 318. Alternatively, the execution unit 110 may find one or more candidate paths. If there are no candidates in the candidate list, the flow continues at block 608. Otherwise, the flow continues at block 610, which is described in more detail below.

At block 608, a runtime error is generated. With reference to FIG. 1, the execution unit 110 may generate the runtime error. As described above, if there are no candidate paths between the current context field and the needed context field, the execution unit 110 cannot access the object having as its context the needed context field. The operations of the flow diagram 600 are complete.

At block 610, the candidate in the candidate list with the closest path to the needed context field is marked. With reference to FIG. 1, the execution unit 110 may perform this operation. In particular, the execution unit 110 marks the best candidate so that during execution this path is used. The candidate that is selected may be based on a number of different criteria. In some embodiments, a path that includes an extends relationship is considered closer than a path that includes a surrogate relationship. For example, each relationship in a candidate path may be assigned a value. An extends relationship may be assigned a lower value in comparison to a surrogate relationship. For example, an extends relationship may be assigned a value of one, and a surrogate relationship may be assigned a value of two. A score would be determined for each candidate path. The execution unit 110 would mark the candidate with the lowest score.

At block 612, a determination is made of whether the field is a reference. With reference to FIG. 1, the execution unit 110 may make this determination. In particular, a field in the associated object may be a reference to the field and not the field itself. If the field is not a reference, the flow continues at block 616 (which is described in more detail below). Otherwise, the flow continues at block 614.

At block 614, the reference to the field is resolved. With reference to FIG. 1, the execution unit 110 may resolve the reference to the field. The execution unit 110 may retrieve a copy of the field from the address associated with the field. The flow continues at block 616.

At block 616, the field is returned. With reference to FIG. 1, the execution unit 110 returns the field. Accordingly, the definition of the field is provided to the object where the field is being used. As described, some embodiments allow the field to be defined in one location and then accessed by different objects, which may be developed by different software developers/programmers. Therefore, the code is easier to maintain. The operations of the flow diagram 600 are then complete.

Figure 7:
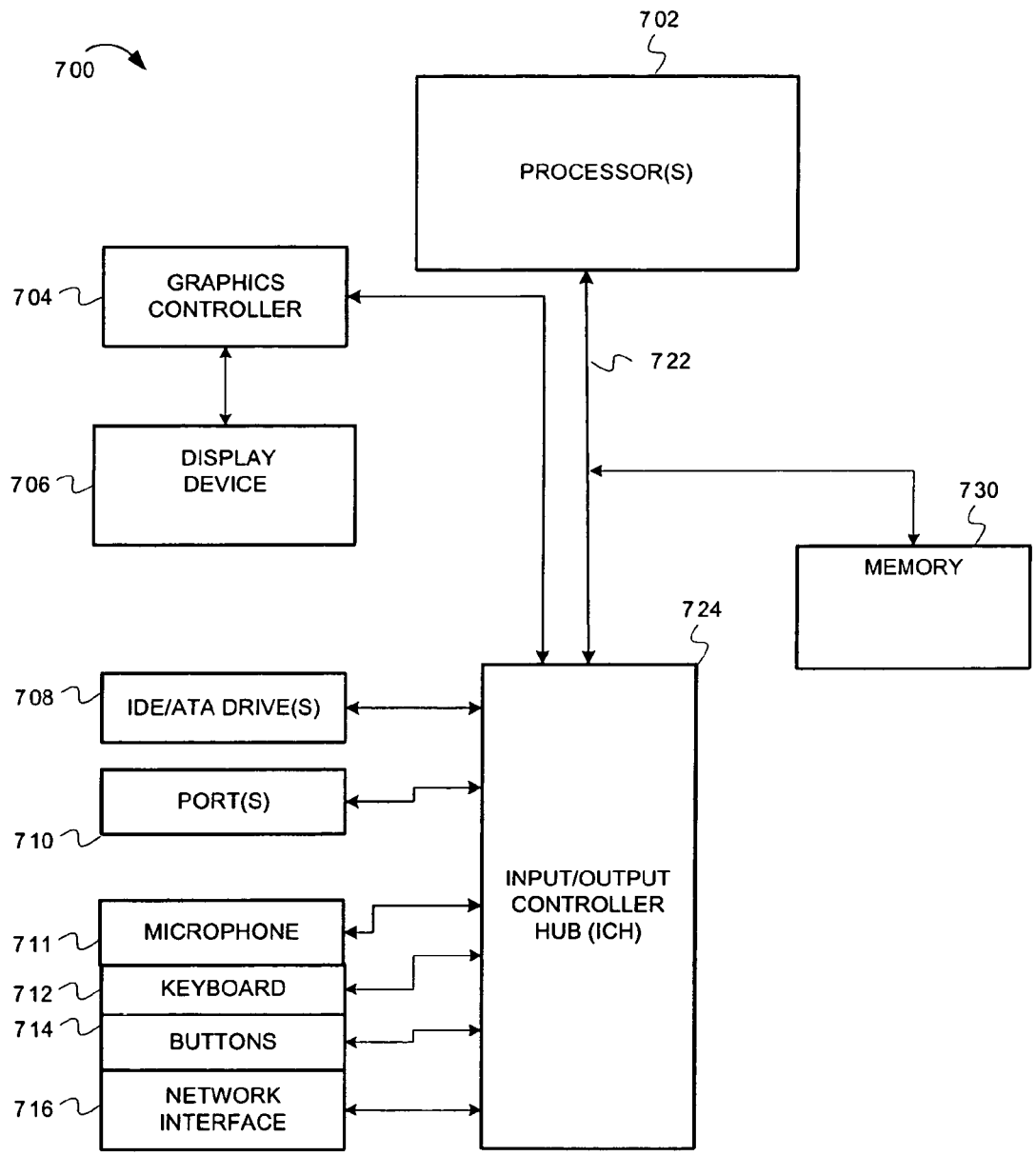
FIG. 7 illustrates an exemplary computer system used in conjunction with certain embodiments of the invention.

This section provides an overview of the exemplary hardware and the operating environment in which embodiments of the invention can be practiced. FIG. 7 illustrates an exemplary computer system used in conjunction with certain embodiments of the invention. As illustrated in FIG. 7, computer system 700 comprises processor(s) 702. The computer system 700 also includes a memory unit 730, processor bus 722, and Input/Output controller hub (ICH) 724. The processor(s) 702, memory unit 730, and ICH 724 are coupled to the processor bus 722. The processor(s) 702 may comprise any suitable processor architecture. The computer system 700 may comprise one, two, three, or more processors, any of which may execute a set of instructions in accordance with at least some embodiments of the invention.

The computer system 700 also includes a volatile memory 230, processor bus 222, and an Input/Output (I/O) controller hub (ICH) 224. The processor(s) 202, the volatile memory 230, and the ICH 224 are coupled to the processor bus 222. The processor(s) 202 may comprise any suitable processor architecture. The computer system 700 may comprise one, two, three, or more processors, any of which may execute a set of instructions in accordance with embodiments of the invention. The processor(s) 202 may be different types of processors. For example, a first processor may be a general purpose processor, while a second processor may be a digital signal processor for decoding and encoding audio data, video data, etc.

The memory 230 may be representative of volatile and/or nonvolatile memory that stores data and/or instructions, and may comprise any suitable memory, such as a dynamic random access memory (DRAM), etc. The nonvolatile memory may be Static Random Access Memory (SRAM), flash memory, etc. The nonvolatile memory may also be Programmable ROM (PROM), Erasable PROM (EPROM), Electrically Erasable PROM (EEPROM), etc.

The computer system 700 may include the parser 102, the database table generator 104, the object-oriented code generator 106, the compiler 108 and/or the execution unit 110. The parser 102, the database table generator 104, the object-oriented code generator 106, the compiler 108 and/or the execution unit 110 may be representative of hardware, firmware or a combination thereof. The parser 102, the database table generator 104, the object-oriented code generator 106, the compiler 108 and/or the execution unit 110 may be software instructions that reside in the memory 230 and/or one of the IDE/ATA drives 208, which may be executed by the processor(s) 202.

A graphics controller 204 controls the display of information on a display device 206, according to some embodiments of the invention. The ICH 224 provides an interface to I/O devices or peripheral components for the computer system 700. The ICH 224 may comprise any suitable interface controller to provide for any suitable communication link to the processor(s) 202, the volatile memory 230 and/or to any suitable device or component in communication with the ICH 224. In some embodiments, the ICH 224 provides suitable arbitration and buffering for each interface.

For some embodiments of the invention, the ICH 224 provides an interface to a secondary storage 208 (which may be any type of nonvolatile data storage), such as a hard disk drive (HDD) or compact disc read only memory (CD ROM) drive, or to suitable universal serial bus (USB) devices through one or more USB ports. The secondary storage 208 may be read only, read/write, etc.

For some embodiments, the ICH 224 also provides an interface different user input devices (a microphone 211, a keyboard 212, buttons 214, etc.). For some embodiments, the ICH 224 also provides a network interface 220 though which the computer system 700 may communicate with other computers and/or devices. The ICH 224 may provide an interface to any number of ports 210. The ports 210 may be used to provide different input/output.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment," "an embodiment," "an example embodiment," and so on, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (that is, stores and/or transmits) information in a form accessible by a machine (for example, a computer, a network device, a personal digital assistant, manufacturing tool, any device with a set of one or more processors, and so on). In an exemplary embodiment, a machine-readable medium includes volatile and/or non-volatile media (for example, read-only memory (ROM), random access memory (RAM), magnetic disk storage media, optical storage media, flash memory devices, and so on), as well as electrical, optical, acoustical or other form of propagated signals (for example, carrier waves, infrared signals, digital signals, and so on)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for ontology context logic at the key field level, in accordance with embodiments of the invention. A number of figures show flow diagrams illustrating operations for ontology context logic at the key field level, in accordance with embodiments of the invention. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computer-implemented method comprising:
receiving a pattern language code having definitions of a number of classes, wherein a definition of a first class of the number of classes comprises a reference to a first key field, wherein a definition of a second class comprises a reference to a second key field, wherein the first key field references a first external object and the second key field references a second external object, wherein the first external object and the second external object are different external objects, and wherein the first external object is in an ontological relationship with the second external object in order to establish a surrogate relationship; and
compiling, using one or more processors, the pattern language code to generate object code, wherein the compiling comprises validating the surrogate relationship between the first and second classes;
wherein the surrogate relationship defines a relationship where the second class can functionally replace the first class in the compiled object code.

2. The computer-implemented method of claim 1, wherein the receiving a pattern language code includes a definition of a third class of the number of classes, wherein the definition of the third class includes a reference to a third key field, wherein the third key field references the first external object, and wherein the first and third key fields establish an extends relationship between the first and third classes; and
wherein the compiling the pattern language code to generate an object code includes validating the extends relationship between the first and third classes;

wherein the extends relationship defines a relationship where the third class extends the functionality of the first class in the compiled object code.

3. The computer-implemented method of claim 2, wherein the receiving a pattern language code includes a definition of a fourth class of the number of classes,
wherein the definition of the fourth class includes a reference to a fourth and a fifth key field,
wherein the fourth key field references a third external object, wherein the third external object is in an ontological relationship with the first external object in order to establish a surrogate relationship,
wherein the fifth key field references the second external object, and wherein the second and fifth key fields establish an extends relationship between the second and fourth classes; and
wherein the compiling the pattern language code to generate an object code includes validating the extends relationship between the second and fourth classes and the surrogate relationship between the third and fourth classes,
wherein the extends relationship defines a relationship where the fourth class extends the functionality of the second class and the surrogate relationship defines a relationship where the fourth class can functionally replace the third class in the complied code.

4. The computer-implemented method of claim 2, wherein the first class includes characteristics not included in the third class; and
wherein the third class includes characteristics not included in the first class.

5. A computer-implemented method comprising:
receiving pattern code including definitions of a plurality of business classes, wherein a definition of each of the plurality of business classes includes a reference to a key field, wherein each key field of each of the plurality of business classes references an external object of a plurality of external objects, wherein a definition of a first business class of the plurality of business classes includes a reference to a first key field, wherein the first key field references a first external object, wherein the first external object is in an ontological relationship with each of the other external objects and, wherein the ontological relationships include a surrogate relationship between the first external object and one of the other external objects and an extends relationship between the first external object and one of the other external objects; and
compiling, using one or more processors, the code to generate an executable, wherein the compiling includes validating the surrogate and extends relationships between the first business class and the plurality of business classes;
wherein the surrogate relationship defines a relationship where one of plurality of business classes can functionally replace the first business class in the compiled object code;
wherein the extends relationship defines a relationship where one of the plurality of business classes extends the first business class in the compiled object code.

6. The computer-implemented method of claim 5, further comprising:
generating a compiler error, in response to a determination that the first business class is not in a surrogate or extends relationship with one of the plurality of business classes; and
executing the executable after compiling the code, in response to a determination that no compiler errors were generated.

7. The computer-implemented method of claim 5, wherein compiling includes establishing a candidate path between the first business class and one of the plurality of business classes through one or more extends and surrogate relationships.

8. The computer-implemented method of claim 5, wherein compiling includes establishing a plurality of candidate paths among extends and surrogate relationships between the first business class and each of the plurality of business classes.

9. The computer-implemented method of claim 8, wherein compiling includes assigning a score to each candidate path of the plurality of candidate paths.

10. The computer-implemented method of claim 9, wherein the score is based on the arrangement of extends and surrogate relationships within the candidate path.

11. The computer-implemented method of claim 10, wherein the extends and surrogate relationships are weighted differently in determining the scores,
wherein compiling includes selecting a candidate path, from the number of candidate paths, with the lowest score, and
wherein business class of the plurality of business classes with the lowest candidate path score replaces the first business class in the compiled code.

12. A computer-implemented method comprising:
receiving a pattern language code having definitions of a number of classes,
wherein a definition of a first class of the number of classes includes references to a first key and a second key field,
wherein a definition of a second class of the number of classes includes references to a third and a fourth key field,
wherein a definition of a third class includes references to a fifth and a sixth key field,
wherein a definition of a fourth class includes references to a Seventh and an eighth key field,
wherein the first, fifth, and seventh key fields all reference an external object A,
wherein the second, fourth, and sixth key fields all reference an external object B,
wherein the third key field references an external object C,
wherein the eighth key field references an external object D,
wherein the first and the seventh key fields establish an extends relationship between the first and fourth classes, and
wherein the second and fourth key fields establish an extends relationship between the first and second classes; and
compiling the pattern language code to generate an executable, wherein the compiling includes validating the extends relationships between the first and second classes and the first and fourth classes, and replacing the first class with one of the second or fourth classes while compiling;
wherein the extends relationship defines a relationship where the second and fourth classes extend the functionality of the first class in the compiled code, and wherein the first class includes characteristics not included in the second and fourth classes and the second and fourth classes include characteristic not included in the first class.

13. The computer-implemented method of claim 12, wherein the external object C is in an ontological relationship with the external object A in order to establish a surrogate relationship,
   wherein compiling the pattern language code includes validating the surrogate relationship between the first and second classes and the second and third classes, and
   wherein the surrogate relationship defines a relationship where the second class can functionally replace the first or third classes in the compiled code.

14. A system comprising:
   a computer including one or more processors and memory device coupled to the one or more processors, the computer further including,
   a code generator configured to generate a pattern language code having definitions of a number of classes, wherein a definition of a first class of the number of classes comprises a reference to a first key field, wherein a definition of a second class comprises a reference to a second key field, wherein the first key field references a first external object and the second key field references a second external object, wherein the first external object and the second external object are different external objects, and wherein the first external object is in an ontological relationship with the second external object in order to establish a surrogate relationship; and
   a compiler configured to compile the pattern language code into an executable, wherein the compiler is configured to validate the surrogate relationship between the first and second classes while compiling;
   wherein the surrogate relationship defines a relationship where the second class can functionally replace the first class in the compiled object code.

15. The system of claim 14, wherein the code generator is further configured to generate a pattern language code including a definition of a third class of the number of classes, wherein the definition of the third class includes a reference to a third key field, wherein the third key field references the first external object, and wherein the first and third key fields establish an extends relationship between the first and third classes; and
   wherein the compiler is further configured to validate the extends relationship between the first and third classes while compiling;
   wherein the extends relationship defines a relationship where the third class extends the functionality of the first class in the compiled object code.

16. The system of claim 15, wherein the first class includes characteristics not included in the third class; and
   wherein the third class includes characteristics not included in the first class.

17. A system comprising:
   a computer including one or more processors and a memory device coupled to the one or more processors, the computer further including,
   a code generator configured to generate a pattern language code having definitions of a number of classes, wherein a definition of a first class of the number of classes comprises a reference to a first key field, wherein a definition of a second class comprises a reference to a second key field, wherein the first key field and the second key field references a first external object, and wherein the first and third key fields establish an extends relationship between the first and third classes; and
   a compiler configured to compile the pattern language code into an executable, wherein the compiler is configured to validate the extends relationship between the first and second classes while compiling;
   wherein the extends relationship defines a relationship where the third class extends the functionality of the first class in the compiled object code, wherein the first class includes characteristics not included in the second class, and wherein the second class includes characteristics not included in the first class.

* * * * *